No. 728,299. PATENTED MAY 19, 1903.
E. W. RICE, Jr.
SYSTEM OF ELECTRICAL DISTRIBUTION.
APPLICATION FILED JAN. 2, 1901.
NO MODEL.
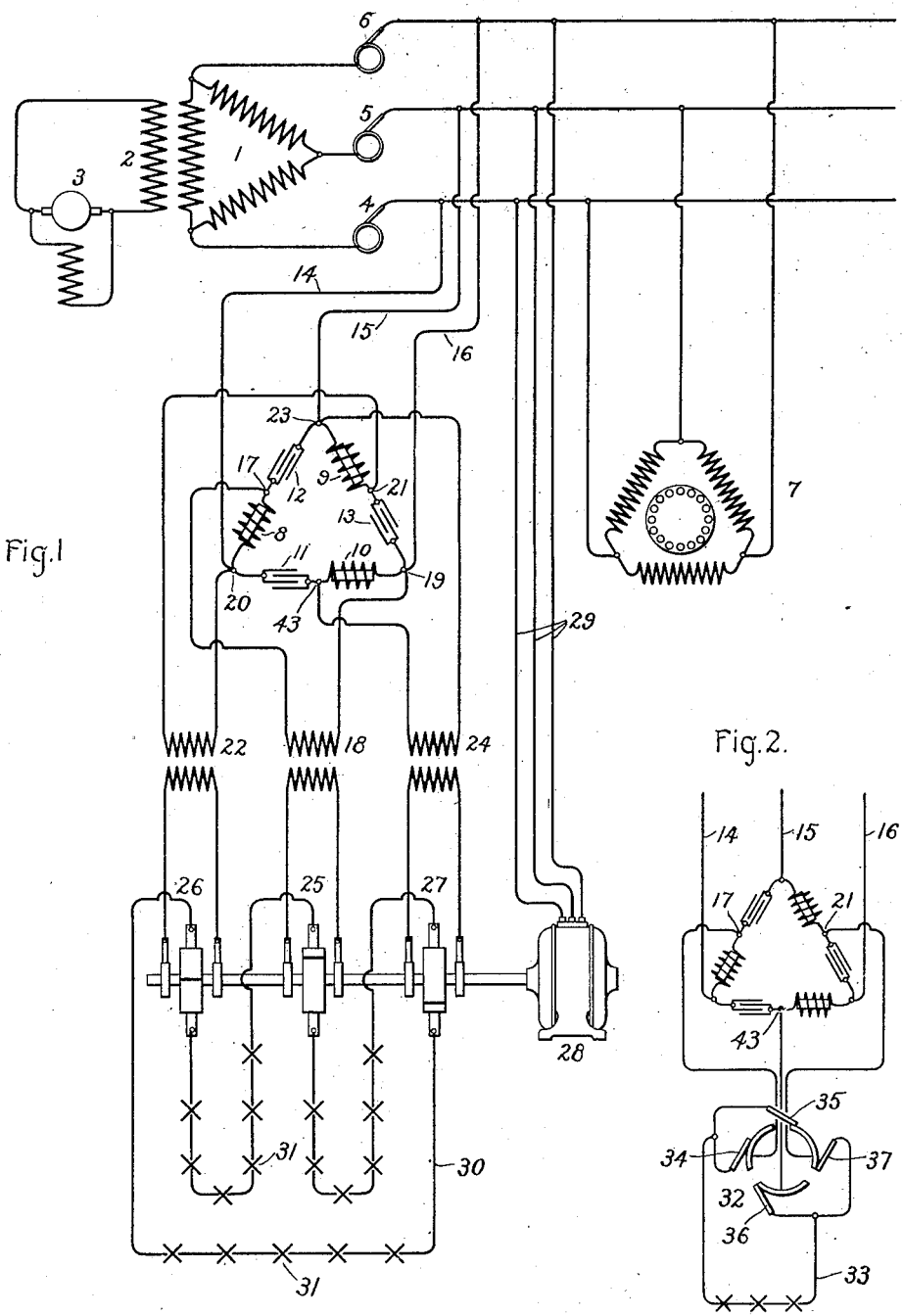
Witnesses.
John Ellis Glenn
Benjamin B Hull
Inventor.
Edwin W. Rice Jr.
by Albert G. Davis
Atty.

No. 728,299. Patented May 19, 1903.

UNITED STATES PATENT OFFICE.

EDWIN W. RICE, JR., OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 728,299, dated May 19, 1903.

Application filed January 2, 1901. Serial No. 41,762. (No model.)

*To all whom it may concern:*

Be it known that I, EDWIN W. RICE, Jr., a citizen of the United States, residing at Schenectady, county of Schenectady, State of New York, have invented certain new and useful Improvements in Systems of Electrical Distribution, of which the following is a specification.

My present invention relates to means for deriving a rectified constant current from a source of alternating current of approximately constant potential, and includes among its features of novelty certain improvements in the manner of obtaining the constant alternating current to be rectified, as well as in the arrangements for rectifying the same.

The scope of the invention, both in its broad and narrow aspects, will be particularly pointed out in the claims appended hereto, while as to the details of construction and mode of operation of the invention reference may be had to the following description, taken in connection with the accompanying drawings, in which—

Figure 1 represents a system embodying my invention, and Fig. 2 a modification.

In Fig. 1 I set forth means for generating multiphase alternating current, in this case three-phase, the multiphase alternating current thus produced being passed through a constant-potential constant-current transforming apparatus and then to a rectifying-commutator, the whole arrangement being represented in diagram. The source of three-phase current is represented conventionally by the triangular arrangement of windings 1, which indicate generating-windings of a three-phase machine the field-winding 2 of which is excited by direct current derived from a suitable source, such as the exciter 3. The terminals 4, 5, and 6, connected to the generating-windings, supply current to transmission-lines correspondingly designated. To these transmission-lines translating devices of any desired character may be connected. As typifying such translating devices, I have indicated an induction-motor 7, connected to the transmission-lines.

In order to derive the rectified constant current, which it is one of the objects of my invention to produce, I connect to these transmission-lines 4, 5, and 6 a constant-potential constant-current transforming apparatus, consisting in the present instance of a closed circuit including reactances of opposite sign alternately arranged in series with respect to each other. These reactances may consist of inductance-coils and condensers, the closed circuit including three of each arranged as specified. In the drawings these alternately-connected inductance-coils and condensers are indicated at 8 to 13, inclusive.

Leads 14, 15, and 16 are connected, respectively, to the transmission-lines 4, 5, and 6 and serve to convey alternating current of constant potential to the transforming device thus described. The points of connection of these leads with the closed circuit including the inductance-coils and condensers are so chosen that each pair of the leads spans two adjacent reactances of opposite sign—that is to say, a condenser and its adjacent inductance-coil. In the drawings these connections have been made so that the leads 14 and 15 are connected across the inductance-coil 8 and the condenser 12, the leads 15 and 16 across the inductance-coil 9 and the condenser 13, and the leads 16 and 14 across the inductance-coil 10 and a condenser 11. Constant-potential alternating current being now supplied to this combination of reactances in which there is an inductance-coil and a condenser in series across each pair of leads, there is produced across the terminals of any one of the condensers or inductance-coils an electromotive force, which appears at right angles or in quadrature to that impressed upon the terminals of that pair of reactances to which the particular condenser or inductance-coil belongs. To produce this result, the condenser and inductance of each pair must be proportioned relatively to each other, so as to be in resonance condition, the manner of securing this proportioning being well understood by those skilled in the art. When thus proportioned, the electromotive force across the terminals of any one of the inductance-coils or condensers is in quadrature with the impressed constant-potential electromotive force and varies in such a manner as would maintain a constant current in a circuit supplied thereby. This automatic regulation is not impaired, but is, on the contrary, increased in range and the regulation actually improved in some respects if an electromotive force of constant potential be included in circuit therewith, this electromotive force being preferably chosen so as to be in phase with that of the constant-current circuit. In Fig. 1 three constant-current circuits of this character are represented. One of these circuits is connected at 17 to the junction between the inductance-coil 8 and the condenser 12 and through the primary of a transformer 18 to the point 19 at the opposite angle of the triangular arrangement of reactances. The inductance-coil 8 and the condenser 12 being supplied with current from the constant-potential mains 14 and 15 impress upon this circuit 17 19 an electromotive force which regulates for constant current, this electromotive force, however, being combined with the resultant of the two electromotive forces between the leads 15 16 and 14 16, respectively, this resultant being, as will readily be understood, at right angles to that between the leads 14 and 15, and therefore in phase with the constant-current electromotive force derived from the inductance-coil 8 and the condenser 12. In a similar manner a second constant-current circuit is connected between the point 20 corresponding to the lead 14 and the point 21 between the inductance-coil 9 and the condenser 13, which are in series across the two remaining leads 15 and 16, this constant-current circuit likewise including the primary of a transformer 22.

A third constant-current circuit is connected to a point 23 representing the junction of the lead 15 with the transforming apparatus and a point 43 between the inductance-coil 10 and condenser 11 in series across the other two leads 14 and 16, this last constant-current circuit likewise including the primary of still another transformer 24.

The secondaries of the transformers 18, 22, and 24 are connected, respectively, to rectifying-commutators 25, 26, and 27, these commutators being driven in synchronism with the waves of the alternating current. Any suitable means is employed for this purpose— as, for example, a synchronous motor 28— this motor being supplied with alternating current through the leads 29, connected to the transmission-lines 4, 5, and 6. The direct current for exciting the motor may be derived from a suitable source. (Not here shown.)

The respective rectifying-commutators 25, 26, and 27, which may be of any ordinary type, are connected in series with each other through the medium of a consumption-circuit 30, including translating devices of any desired character—as, for example, arc-lamps— indicated conventionally by the crosses, such as at 31. To reduce the maximum difference of potential existing between any two points of this circuit, some of these translating devices may be interposed in a circuit joining each pair of rectifying-commutators in series, this arrangement of translating devices being well understood in the art and commonly designated as a "multicircuit" connection.

One object of interposing the transformers 18, 22, and 24 is to render the respective constant-current circuits to which they are connected electrically independent of each other, thereby permitting the several constant-current circuits to be connected in series with each other, if so desired. Moreover, the transformers by saturation of their cores limit the constant-current voltage in case of open circuit at the rectifier.

In case independence of the constant-current circuits is not desired they may be consolidated, as shown in Fig. 2, the three-phase leads being represented, as in Fig. 1, at 14, 15, and 16 and the connections of one terminal of each of the three constant-current circuits at 17, 21, and 43, respectively. The return-circuit of each of these constant-current circuits is omitted, the three constant-current circuits being connected together through the instrumentality of the rectifying-commutator 32 and the consumption-circuit 33 supplied thereby. These connections enable each one of the constant circuits to serve as a common return for the other, the principle being the same as that involved in the omission of the three return-conductors where three separate three-phase circuits are combined with each other.

It is important in the operation of the constant-current rectifying-commutator 32 that no one of the constant-current circuits should be interrupted even for an instant, since this would give rise to an enormously-large electromotive force at the break. To avoid this, the brushes should be arranged on the commutator so that no one of the segments shall at any time be open-circuited. Where a three-part commutator is used, as shown, the terminals of the constant-current circuit 33 are connected, respectively, to two short-circuited brushes, one terminal of the circuit being connected to the brushes 34 and 35 and the other terminal to the brushes 36 and 37. These brushes are spaced so that the angular distance between adjacent brushes of opposite polarity—as, for example, the brushes 35 and 37—is somewhat less than the angle covered by any one of the commutator-segments.

What I claim as new, and desire to secure by Letters Patent of the United States, is—

1. The combination of multiphase supply-conductors, means for deriving therefrom a plurality of constant-current circuits, a rectifier for each circuit, and a single consumption-circuit including all of the rectifiers in series.

2. The combination of constant-potential multiphase supply-conductors, means for deriving therefrom a plurality of constant-current circuits, a rectifier for each circuit, and a single consumption-circuit including all of the rectifiers in series.

3. The combination of a plurality of transformers, means for impressing upon the primaries of the transformers electromotive forces which vary automatically in such manner as to maintain a constant current in the secondary of each transformer, a rectifier for each secondary, and a consumption-circuit fed from said rectifiers.

4. The combination of a plurality of transformers, means for impressing upon the primaries of the transformers electromotive forces which vary automatically in such manner as to maintain a constant current in the secondary of each transformer, a rectifier for each secondary, and a consumption-circuit including said rectifiers in series.

5. The combination of a source of alternating current of constant potential, means for deriving therefrom a plurality of relatively phase-displaced constant currents, a rectifier for each of the constant currents, and means for supplying the rectified currents to a single consumption-circuit.

6. The combination of a source of multiphase alternating current, means for deriving therefrom a plurality of constant currents, means for rectifying said currents, and a series consumption-circuit supplied with the currents thus rectified.

7. The combination of a source of multiphase alternating current, means for deriving therefrom a plurality of relatively phase-displaced constant currents, means for rectifying said currents, and a series consumption-circuit supplied with the currents thus rectified.

8. The combination of multiphase mains, reactances of opposite sign connected across two of the mains, a constant-current circuit operatively connected between the junction of the reactances and another of said mains, a rectifying-commutator in series with said constant-current circuit, and means for synchronously driving said commutator.

9. The combination of alternating-current mains between which phase-displaced electromotive forces are maintained, reactances of opposite sign connected between two of the mains, a constant-current circuit operatively connected between a point on the third main and a junction of two reactances, and a synchronously-driven rectifying-commutator for rectifying the constant current.

10. The combination of a source of alternating current, a circuit fed with constant current through the instrumentality of reactances of opposite signs operatively connected to said source, and a rectifier operatively related to said circuit.

In witness whereof I have hereunto set my hand this 29th day of December, 1900.

EDWIN W. RICE, Jr.

Witnesses:
BENJAMIN B. HULL,
MARGARET E. WOOLLEY.